L. Stratton,
Shoe Sole Machine,
Nº 14,432.
Patented Mar. 11, 1856.
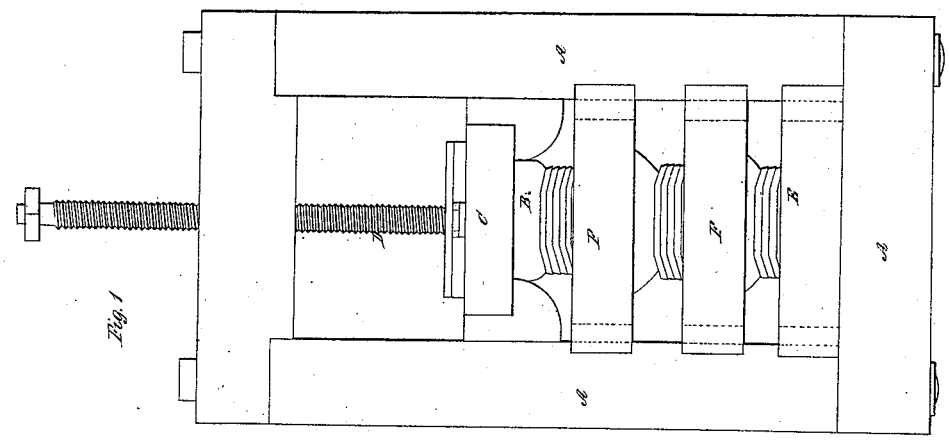
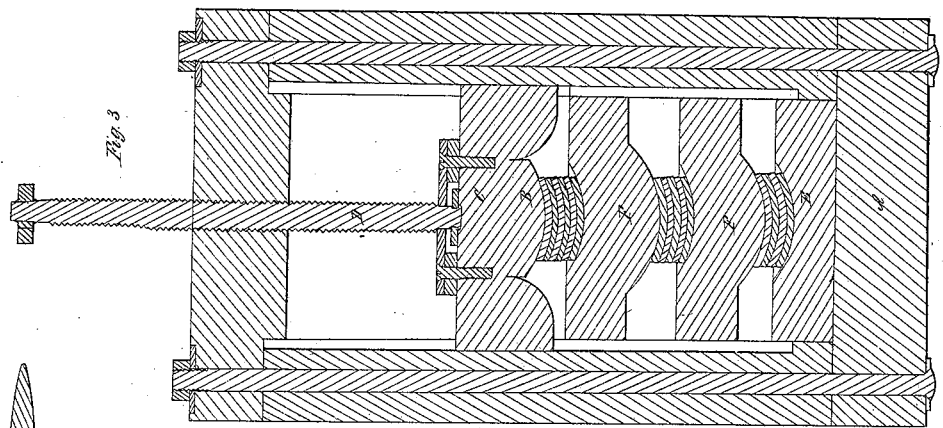
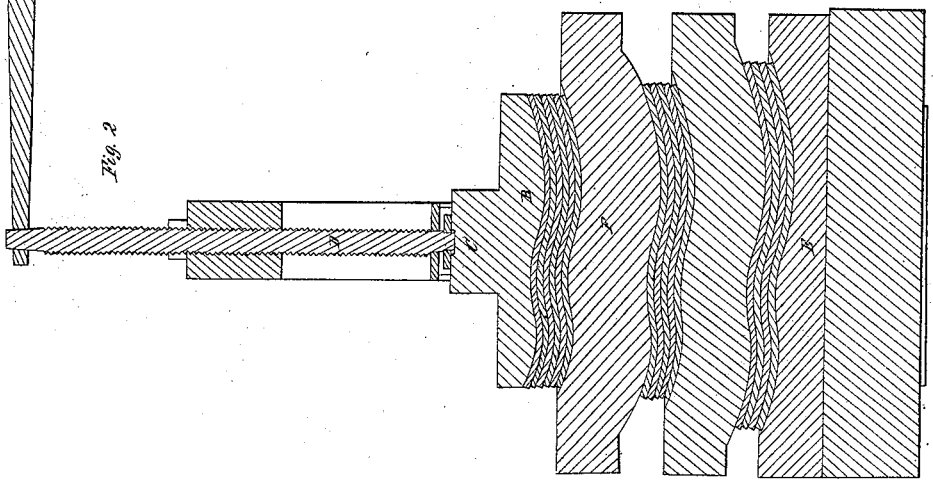

UNITED STATES PATENT OFFICE.

LORENZO STRATTON, OF FELTONVILLE, MASSACHUSETTS, ASSIGNOR TO HIMSELF AND LUTHER HILL.

MANUFACTURE OF BOOT AND SHOE SOLES.

Specification of Letters Patent No. 14,432, dated March 11, 1856.

*To all whom it may concern:*

Be it known that I, LORENZO STRATTON, of Feltonville, in the county of Middlesex and State of Massachusetts, have invented a new and useful Machine for the Purpose of Bending and Shaping the Soles of Boots and Shoes, of which the following is a full, clear, and exact description, reference being had to the annexed drawings, making part of this specification, in which—

Figure 1 is an elevation of my machine. Figs. 2 and 3 are vertical sections through the same.

On the 20th June 1854 a patent was granted to myself in conjunction with Luther Hill of Stoneham, Mass., for a "Machine for cutting out boot soles." In this machine the leather is forced down upon a knife, the outline of which corresponds with that of the sole and the leather is temporarily bent into the form it is ultimately to have that the edge of the sole may remain vertical when the boot is made up. In this machine there is but a single former and the bending is but momentary the sole instantly returning to its original form so soon as it is cut; the shaping of the sole being a subsequent operation which has heretofore been performed by hammering upon a lap stone and upon the last. For the purpose of performing this operation with greater despatch and precision I have contrived the following described machine.

A is a strong frame of wood or iron.

B is a former attached to the follower C which is raised and lowered by the screw D in a manner which is apparent from an inspection of the drawings. The bottom of the former B is convex and is made to correspond exactly with the upper surface of the finished sole.

E is a counter former having a concavity or depression in its upper surface corresponding with the bottom surface of the sole. The soles being cut out by the before mentioned sole cutter or in any other manner are submitted to pressure between the former B and counter former E the follower being brought down by the screw D as before mentioned; the soles are thus bent into the shape which they are required to have, and are for a number of hours submitted to a degree of pressure sufficient to cause them to retain the shape given them in the machine.

Where a larger number of soles is required than can be shaped by a single former and counter former I make use of intermediate formers F, F, the upper and under surfaces of which are shaped like the upper and under surface of the former and counter former; these intermediate formers may be of wood or iron, and are employed as seen in the drawings, a suitable number of soles being introduced between each former. A single machine may thus be made to shape a large number of soles, each one being submitted to an equal pressure and bent to the same shape.

By the use of the above described machine, a great amount of labor is saved, the operation of bending the soles having heretofore been performed by hand as before stated.

Having thus fully described my invention what I claim therein as new and desire to secure by Letters Patent is—

The above described improvement in the manufacture of shoe soles viz: striking them up in nests between formers and counter-formers B, E, F, substantially in the manner herein set forth.

LORENZO STRATTON.

Signed in presence of—
G. S. RANSOM,
RUFUS STRATTON, 2nd.